Patented May 22, 1934

1,959,686

UNITED STATES PATENT OFFICE 1,959,686

METHOD OF MAKING BRAKE LININGS CONTAINING FRICTIONING COMPOUNDS

William Nanfeldt, Paterson, N. J., assignor to World Bestos Corporation, Paterson, N. J., a corporation of Delaware No Drawing. Application April 13, 1929, Serial No. 354,988

5 Claims. (Cl. 28—1)

The present invention relates to brake linings containing frictioning compounds and a method of making the same, and more particularly to a novel form of brake lining containing or having impregnated therein, a novel form of frictioning material for producing the desired frictioning action in brake linings without introducing glazing action or producing changes in the coefficient of friction of the lining with changes in temperature, and to a new and useful method of making the same.

Various materials which are in common use for producing frictioning action in brake linings have certain disadvantages in their operation which it has been sought to overcome for many years. While a combination of elements may be added or impregnated into the lining, which separately introduce certain desired properties and which operate satisfactorily for a considerable period of time, the use of a large number of materials is uneconomical from the viewpoint of commercial production in that it increases the time and cost of manufacture and because of the large number of factors involved, the range of variation in the product is greatly increased.

I have discovered that by the use of the materials hereinafter more fully described, the number of constituents introduced to develop the desired frictioning action in brake linings may be materially decreased, without any sacrifice of desired properties, and that a more uniform product having improved frictional qualities may be obtained.

It has been known for many years that in the making of rubber substitutes, vegetable oils such as rapeseed oil and cottonseed oil may be heated with sulphur to a sufficient temperature to bring about a reaction resulting in the formation of a liquid which thickens on cooling and solidifies to a black elastic solid resembling rubber.

I have found that by a somewhat similar treatment, I may bring about a reaction to form an oil product which, however, does not solidify on cooling, and which may be incorporated or impregnated into the brake linings in place of ingredients or combinations of ingredients heretofore used such as rubber compounds, asphaltic material and other ingredients. After the oil product has been incorporated into the lining, the material is subsequently dried under suitable temperatures in an oven, for example, to complete the absorption and fixation of the oil product in the lining.

The method which I preferably employ, is to treat linseed oil by heating it to about 200° C. with flowers of sulphur, about 5% of the weight of the material being used. The mixture is slowly heated and stirred to maintain a homogeneous mixture and to distribute the sulphur throughout the body of the oil for reaction therewith. Substantially no chemical reaction takes place before the temperature of 200° C. is reached, at which point a change in color of the material occurs when the absorption reaction begins, the oil turning to a dark brown. The liquid is then allowed to stand with continued stirring, preferably from about 15 minutes to one-half an hour at which time the reaction will have been completed. The oil may thereafter be allowed to stand until certain gummy constituents or residues have settled to the bottom, the liquid being then decanted, leaving the residues which may be thrown away.

In the impregnation of the brake lining with the oil product, made as above described, a woven asbestos brake lining is preferably used, although any other form of lining may obviously be employed. I preferably pass this lining through a bath made up of equal parts of the modified linseed oil product, prepared in the manner above described, and China wood oil of the usual commercial form, this mixture being then dissolved or admixed with an equal part of a solvent, such as amyl acetate, for example, in order to attain the desired consistency or fluidity to effect suitable impregnation. The lining may be passed through the liquid in the bath in the usual manner to obtain substantially complete impregnation of the lining, the lining being then dried in an oven for about one hour, preferably at a temperature of 375° F., being then rolled in the usual manner, and may then be cut into suitable lengths for brake linings.

While I preferably employ equal parts of the modified linseed oil product and China wood oil, I may if desired, use the modified linseed oil with a modified China wood oil treated separately in a manner similar or substantially the same as that to which the linseed oil has been subjected, that is by treatment with sulphur at a high temperature. In the treatment of China wood oil in this manner, I preferably employ a partially polymerized China wood oil and use therewith an amount of sulphur equivalent of 5% of the weight of the China wood oil treated, and heat the China wood oil to approximately 200° C. to 250° C., while stirring the oil to distribute the sulphur therethrough. The China wood oil is preferably partially polymerized by heating it in air of 275° C. for about half an hour. While I preferably employ partially polymerized China wood oil in the treatment of the lining, it is to be understood that satisfactory results may be obtained by the use of unpolymerized China wood oil.

In the treatment of the brake lining, I may then employ, for example, equal parts or other desired proportions of the modified China wood oil and modified linseed oil product, which may be used with a suitable proportion of solvent, such as benzol, to produce the desired impregnation in the lining and frictioning action in the final brake lining produced.

I have found that either of the mixtures of modified linseed oil with unmodified China wood oil or with modified China wood oil may be used with great advantage in brake linings, although by using China wood oil and the sulphur-absorbed linseed oil, a softer braking action is obtained than is produced by the use of a mixture of modified China wood oil and modified linseed oil.

I have also found that by the use of a mixture of the modified, or sulphur-absorbed oils, a greater uniformity of frictioning action with changes of temperature is obtained than with that in which unmodified China wood oil is used, although the coefficient of friction with these materials is somewhat less than that produced with a mixture of China wood oil and the sulphur-modified linseed oil.

As an example of the way in which China wood oil may be modified by the sulphur treatment, the following method, constituting the preferred mode of treatment with China wood oil, may be used. The China wood oil to be used is first partially polymerized by slowly heating the oil to a temperature of about 275° F. in the open, or with access of air, the temperature being maintained for about one-half hour. This oil is treated in the proportion of about two pounds of China wood oil to about .45 grams of sulphur, which is in the ratio of five per cent (5%) of sulphur to oil.

The following constituents, in the proportions given, may be used as the brake lining impregnating material, it being understood that modified linseed oil or other suitable modified vegetable oil may be used in place of the modified China wood oil.

*Impregnating composition*

| | Ounces |
|---|---|
| Water gas tar | 48 |
| Modified China wood oil | 6 |
| Solvent benzol | 54 |

When a brake lining material, made from woven asbestos yarns, is treated by impregnation in a bath containing liquid of the above composition and the lining is subsequently dried for about one hour in an oven at a temperature of about 375° F., the lining absorbs in the neighborhood of about 40%, dry weight of the impregnating material. If China wood oil is modified without the preliminary partial polymerization, the same brake lining absorbs only about 27.6% dry weight of the impregnating liquid, and does not operate as efficiently or have as long a life.

In the drying treatment of the lining in the oven, the solvent material is driven off together with certain volatile constituents and more or less polymerization of the modified vegetable oil takes place during the treatment.

In the use of the above composition the addition of mineral fillers, such as litharge or other pigments, may be obviated, the desired frictioning characteristics being obtained without their use, whereby a lining having a very much greater life than linings in which mineral constituents having abrasive action are used, is obtained. Furthermore, the lining of the above composition has the advantage of great uniformity in production, not being subject to substantial variation in commercial production.

In connection with the use of the ordinary form of woven asbestos brake lining, containing brass wire used as a core filament, upon which the asbestos paper is folded or twisted and held in place by means of reinforcing filaments, the lining being impregnated with a frictioning impregnating material, I have found that a brass dust appears on the face of the lining when employed on a brake drum, and that the surface or face of the drum becomes chipped or scored to a greater or less extent after being run for a comparatively short time, usually about one hour or less on a brake testing machine. I have also found that the wear thereafter becomes materially greater or more rapid after that time by the gradual cutting action of the steel particles held on the surface of the lining. I have found furthermore, that this action is materially less with the sulphur-absorbed impregnating material above described than is produced with the usual impregnating compositions heretofore employed, such as rubber or untreated oil compositions, for example. This reduced abrasive action is due apparently to more or less coating action on the metallic particles by the modified oils, serving to decrease or impede the action of the brass and steel particles.

I have discovered that I may substantially entirely overcome the abrasive action occurring with the usual wire wound and wire reinforced brass filaments in woven asbestos brake linings, by the use of one or more zinc wires as a core filament, and by using cotton thread as a binding filament in place of the usual brass binding filaments where such binding filaments are to be used in the asbestos brake lining. I have also found that when impregnated with the above modified impregnating substances comprising sulphur-absorbed oils, incorporated into the lining in the manner described, a greatly improved brake lining is obtained. When tested in the usual way in contact with a drum, such as on a brake lining testing machine, substantially no wear of the lining or drum is found to have occurred after a period of four (4) hours operating at a temperature between 400° F. and 500° F. Furthermore, no signs of cutting on the drum or chipping off of particles of steel from the drum are apparent.

The action of the zinc wire core in the yarns is apparently to form a surface coating of zinc on the brake drum as soon as the surface of the brake lining has received initial wear. This thin deposit of zinc serves undoubtedly as a lubricant to protect the surface of the metal drum, and also operates in conjunction with the modified oil, above described, as a frictioning agent, producing an exceedingly high co-efficient of friction operating without noise or squeaks and without any tendency of wearing away or cutting the brake drum upon which it operates. It has been found that with a lining employing zinc wire as a core element for the asbestos yarns from which the brake lining is made, and by impregnating the lining with modified linseed oil or China wood oil, in the manner above described, a lining is produced which has about three times the life or wearing qualities of the ordinary brake lining heretofore produced using brass wire as a reinforcing filament.

The zinc wire which I preferably employ, contains about 2% to 3% of antimony, although obviously pure zinc, or an alloy of zinc and lead, may be used. It is preferable, however, not to use a zinc having a substantial proportion of lead, for the reason that the melting point of the zinc alloy decreases with increase of lead and the lining would not be able to withstand as high a temperature or provide as uniform a co-efficient of friction with high percentages of lead in the zinc material used.

It is to be understood that in the combination of zinc wire with yarn and addition of the sulphur treated oil material, as above described, a modified action is obtained which is not produced with either constituent alone or through the substitution of other materials for one of the above constituents. The co-efficient of friction of the brake lining containing these interacting constituents and the life of the lining are greatly increased, providing braking action at a much less cost and for longer periods of time than has heretofore been obtained, as far as I am aware.

I desire to have it understood in connection with my invention that other ingredients might be added to the brake lining in addition to the modified oil or oil mixtures above described to obtain any desired frictioning action in the lining. I also may introduce suitable pigments, such as oxides of metals or other desired ingredients to introduce desired properties into the brake lining, although for ordinary purposes such other ingredients are neither required nor desirable.

It will be understood that various changes or modifications may be made in the product and method herein described without departing from the spirit or scope of the invention as defined in the annexed claims.

Having thus described my invention what I claim is:

1. A method for the manufacture of brake linings which comprises forming a brake lining containing asbestos and passing the lining into a bath containing linseed oil modified by the absorption of sulphur at an elevated temperature, China wood oil and a solvent, thereafter drying the lining in an oven and rolling the product.

2. A method of making asbestos brake lining which comprises forming asbestos paper into yarn having zinc wire reinforcement therein, weaving the yarn into asbestos fabric, and incorporating into the lining during its manufacture a modified vegetable oil treated with sulphur at an elevated temperature.

3. A method of making asbestos brake lining which comprises forming asbestos yarn reinforced zinc wire into asbestos fabric, impregnating the said fabric with linseed oil modified at an elevated temperature by the absorption of about five per cent (5%) of sulphur, and drying the said fabric to form the desired product.

4. A method for the manufacture of brake linings which comprises forming asbestos yarns having a core of zinc wire and non-metallic reinforcement, weaving the yarns into a fabric, passing the fabric into a bath containing modified China wood oil formed by partially polymerizing China wood oil and treating it with finely divided sulphur at a temperature of from 200° C. to 250° C. for a sufficient time to bring about the desired modification, and passing the lining into an oven maintained at a temperature of about 370° F., the lining being maintained therein for a sufficient time to dry, and thereafter rolling the said lining.

5. A method for the manufacture of brake linings which comprises forming a brake lining containing asbestos and passing the lining into a bath containing linseed oil modified by the absorption of sulphur amounting to 5% by weight of the linseed oil at an elevated temperature, China wood oil and a solvent, thereafter drying the lining in an oven and rolling the product.

WILLIAM NANFELDT.